United States Patent
Ryan et al.

(10) Patent No.: US 9,086,870 B2
(45) Date of Patent: Jul. 21, 2015

(54) CIRCUIT

(75) Inventors: Stuart Ryan, Bristol (GB); Andrew Michael Jones, Bristol (GB)

(73) Assignee: STMICROELECTRONICS (RESEARCH & DEVELOPMENT) LIMITED, Marlow Bucks (GB)

( * ) Notice: Subject to any disclaimer, the term of this patent is extended or adjusted under 35 U.S.C. 154(b) by 134 days.

(21) Appl. No.: 13/560,237

(22) Filed: Jul. 27, 2012

(65) Prior Publication Data

US 2013/0064143 A1    Mar. 14, 2013

(30) Foreign Application Priority Data

Jul. 28, 2011    (GB) .................................. 1112978.0

(51) Int. Cl.
*H04L 12/28* (2006.01)
*G06F 1/30* (2006.01)
*H04W 52/02* (2009.01)

(52) U.S. Cl.
CPC ............. *G06F 1/30* (2013.01); *H04W 52/0277* (2013.01); *Y02B 60/50* (2013.01)

(58) Field of Classification Search
CPC ... G06F 15/7842; G06F 9/5083; G06F 1/189; G06F 1/30
USPC .......... 370/271, 311, 235; 713/300, 310, 320, 713/321, 322, 323, 324, 330, 340, 693.2, 713/38, 14; 714/14
See application file for complete search history.

(56) References Cited

U.S. PATENT DOCUMENTS

| | | | |
|---|---|---|---|
| 7,478,251 B1 * | 1/2009 | Diab et al. ..................... | 713/300 |
| 8,042,087 B2 * | 10/2011 | Murali et al. ................ | 716/138 |
| 8,286,014 B2 * | 10/2012 | Han et al. ...................... | 713/320 |
| 8,601,310 B2 * | 12/2013 | Dreier .......................... | 714/6.12 |
| 2003/0101373 A1 * | 5/2003 | Freyman et al. ................ | 714/14 |
| 2004/0057576 A1 * | 3/2004 | Lavaud et al. ................ | 379/413 |
| 2006/0161875 A1 * | 7/2006 | Rhee ............................... | 716/14 |
| 2008/0263555 A1 * | 10/2008 | Ventroux et al. ............. | 718/103 |
| 2009/0070549 A1 * | 3/2009 | Solomon ........................ | 712/10 |
| 2010/0080124 A1 * | 4/2010 | Angiolini et al. ............. | 370/235 |
| 2010/0158023 A1 * | 6/2010 | Mukhopadhyay et al. ... | 370/401 |
| 2011/0119322 A1 * | 5/2011 | Li et al. ......................... | 709/201 |
| 2011/0271126 A1 * | 11/2011 | Hill .............................. | 713/320 |

FOREIGN PATENT DOCUMENTS

GB    2 463 108 A    3/2010
WO   WO 2008038235 A2 *  4/2008    ................ G06F 9/46

OTHER PUBLICATIONS

Great Britain Search Report dated Nov. 29, 2011 from corresponding Great Britian Application No. 1112978.0.

* cited by examiner

*Primary Examiner* — Nicholas Jensen
*Assistant Examiner* — Berhanu Belete
(74) *Attorney, Agent, or Firm* — Allen, Dyer, Doppelt, Milbrath & Gilchrist, P.A.

(57) ABSTRACT

A circuit including an initiator of a transaction, an interconnect, and a controller. The controller is configured in response to a condition in a least one first part of the circuit to send a notification via the interconnect to at least one block in a second part of the circuit. The notification includes information about the condition in the first part of the circuit, the condition preventing a response to the transaction from being received by the initiator.

17 Claims, 7 Drawing Sheets

US 9,086,870 B2

CIRCUIT

CROSS REFERENCE TO RELATED APPLICATIONS

This application claims the priority benefit of Great Britain patent application number 1112978.0, filed on Jul. 28, 2011, which is hereby incorporated by reference to the maximum extent allowable by law.

BACKGROUND

1. Technical Field

The present disclosure relates to a circuit.

2. Discussion of the Related Art

Circuitry is known which may be powered by, for example, a mains supply. Such circuitry may incorporate a battery. In the event of power loss from the mains supply, the battery may provide a backup function. When power loss is detected, the circuitry may take steps to switch off components of the circuitry in order to reduce the power consumption and maximize the battery life.

It has been proposed to provide a software driven process in order to switch off the various components. This software driven process may take some time to run. During this software driven process, the circuitry may be in a "fully on" state. This may draw a relatively large amount of current. The capacity and hence the cost of the battery may be determined at least partly by this.

SUMMARY

According to a first aspect, there is provided a circuit comprising: an initiator configured to issue transactions; an interconnect; a controller configured in response to a condition in a least one first part of said circuit to send a notification via said interconnect to said initiator or to an interface associated with said initiator in a second part of said circuit, said notification comprising information about said condition in said first part of said circuit, said condition preventing said initiator from receiving a response to a transaction issued to said first part of said circuit.

According to a further aspect, there is provided a method comprising: issuing transactions by an initiator; in response to a condition in a least one first part of a circuit sending a notification to said initiator or to an interface associated with said initiator in a second part of said circuit, said notification comprising information about said condition in said first part of said circuit, said condition preventing said initiator from receiving a response to a transaction issued to said first part of said circuit.

BRIEF DESCRIPTION OF THE DRAWINGS

For a better understanding of some embodiments, reference will be made by way of example only to the accompanying figures in which.

DETAILED DESCRIPTION

In a traditional telephone system (plain old telephone system—POTS) the subscriber's phone is powered by the telephone cable. This means that if the power supply to the premises fails, the subscriber is still able to make and receive calls. This may be required for emergency phone calls.

With broadband internet being provided to the home, this allows operators to supply multiple services to a subscriber using a single infrastructure (internet protocol—IP). Previously, television, telephone and/or internet may have been delivered in different ways. The provision of, for example, a telephone service as a broadband IP connection is commonly referred to as voice over IP (VoIP).

Generally, broadband internet connections do not supply power and hence the equipment providing these services must be separately powered. In order to prevent the loss of an emergency telephone service, it is often required that if VoIP is the only telephone service to the home that there should be a method of making and receiving calls while the main power supply is disrupted. This may be achieved by a battery backup provided in the VoIP terminal.

Figure 5:
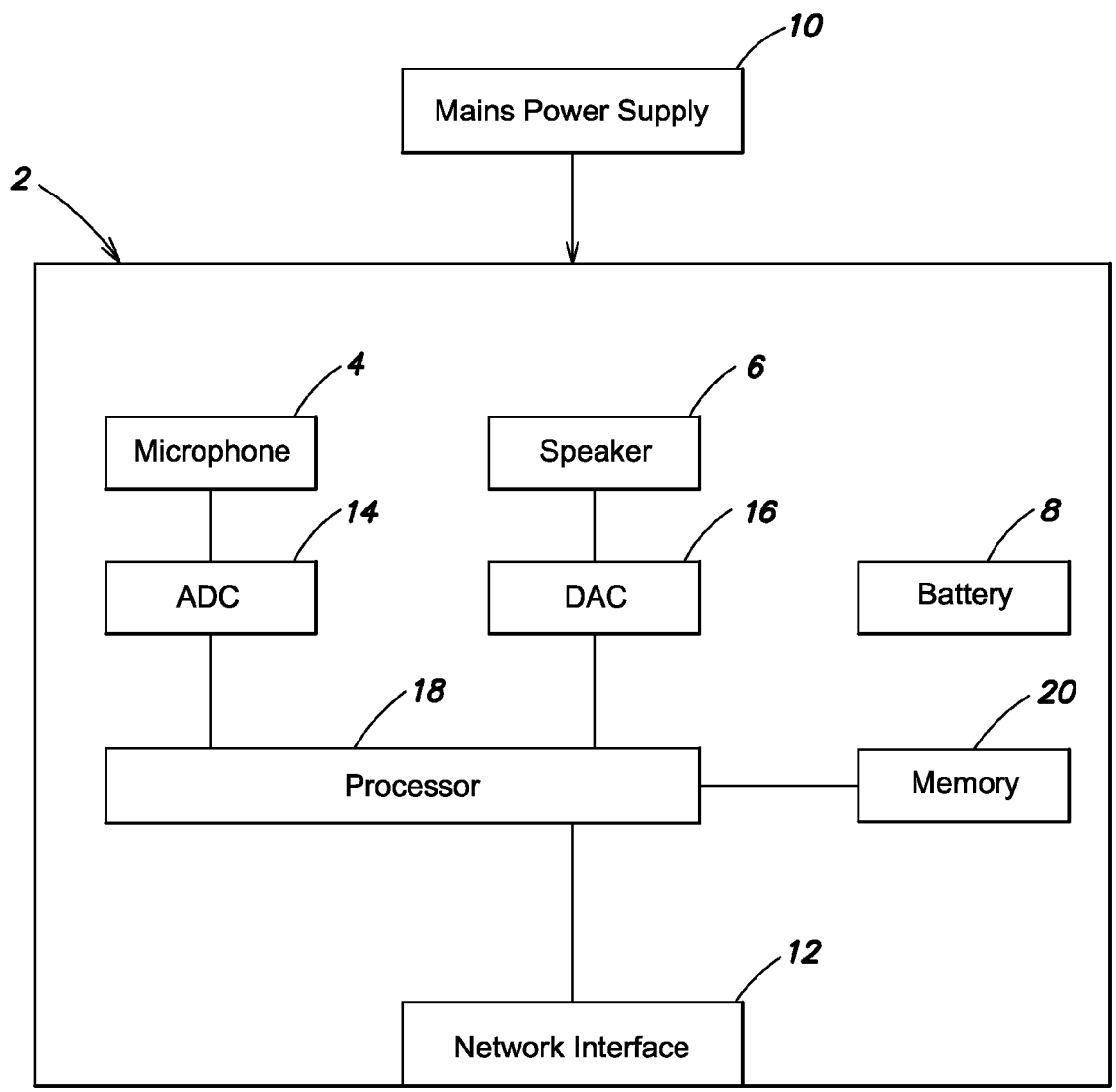
FIG. 5 schematically shows a terminal in which embodiments may be used.

In this regard, reference is made to FIG. 5 which schematically shows a VoIP terminal. It should be appreciated that the VoIP terminal 2 shown in FIG. 5 is schematically shown. The VoIP terminal comprises a microphone 4 which is coupled to an analog-to-digital converter 14. The analog-to-digital converter 14 is arranged to receive voice input from the microphone 4 and convert it for use by, for example the processor 18.

The VoIP terminal also comprises a digital-to-analogue converter 16 which is configured to convert digital data from the processor to an analog form to be output by a speaker 6.

The VoIP terminal comprises a network interface. The interface can be any suitable interface for connecting to a network such as a modem, an internet connection, a serial connection, a wireless connection and/or a broadband connection.

The VoIP terminal also comprises a memory 20 which is schematically shown as coupled to the processor 18. The memory 20 may store data and/or instructions. There may be a single memory or two or more memories.

A battery 8 is also provided for providing a power backup function for the VoIP terminal 2. In practice, the battery will be configured to provide power to one or more of the elements shown in the VoIP terminal 2. The VoIP terminal 2 is also configured to receive power from a mains power supply 10. The mains power supply 10 is configured to provide power to one or more of the elements of the VoIP.

Generally, the VoIP terminal has circuitry providing the broadband internet access and computing resource to transform the voice to and from the compressed digital domain and establish, maintain and end telephone calls over the IP network.

Some service providers may integrate more and more functionality into this terminal, for example providing high speed internet access through WiFi, distribution of TV and/or movies through the home, home automation/security features, 3G femto cells, multiple DECT (Digital Enhanced Cordless Technology) handsets or the like. This increase in functionality means that the terminal may require more power than if it were dedicated to voice only.

Once power is detected in a system, steps will be taken to switch all components in order to reduce power consumption and maximize battery life. For example, one process may implement a software driven process which takes a relatively long time. During this time, the platform is fully on in a state which draws a relatively large amount of current. This means that the battery provided needs to have the ability to provide that current. If the current which is required can be reduced, then a battery with a smaller current may be used which may be cheaper.

Additionally or alternatively, power saving modes may be desirable in some embodiments.

Figure 1:
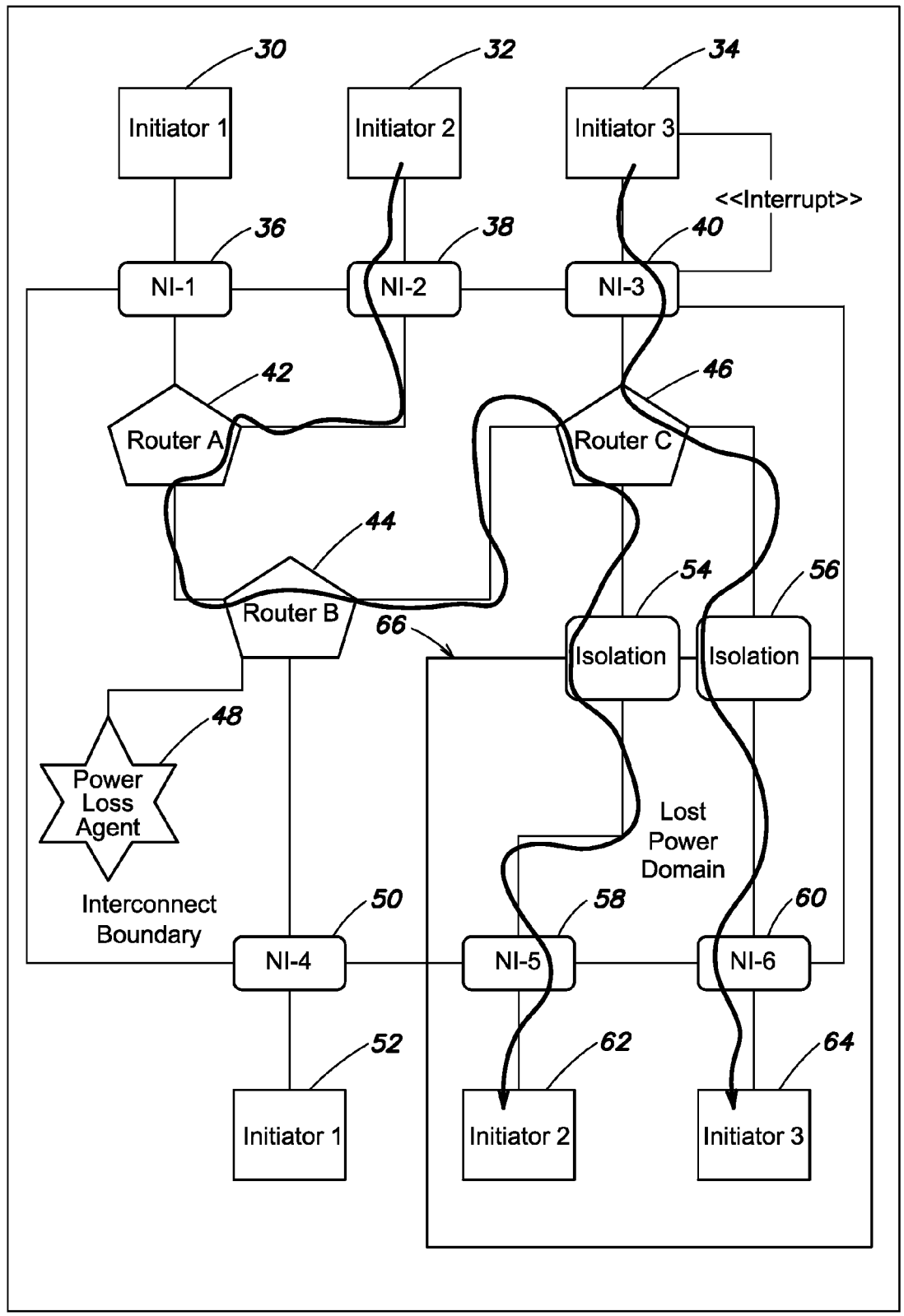
FIG. 1 schematically shows an integrated circuit, illustrating outstanding requests in a lost power domain.

Reference is made to an integrated circuit schematically shown in FIG. 1. The integrated circuit of FIG. 1 comprises a first initiator 30, a second initiator 32 and a third initiator 34. It should be appreciated that more or less than the three initiators shown in FIG. 1 may be provided. Each initiator 30, 32 and 34 has a respective network interface 36, 38 and 40 respectively. In the example shown in FIG. 1, network interface 36 is coupled to a first router 42. The second network interface 38 is also coupled to the first router 42.

The integrated circuit also has a second router 44 which is coupled to the first router 42 and a third router 46. The third network interface 40 is coupled to the third router 46. The routers may form part of a network on chip.

The integrated circuit has a first target 52, a second target 62 and a third target 64. Different embodiments may have more or less than the three targets shown. Each target has a network interface 50, 58 and 60 respectively.

In the arrangement shown in FIG. 1, the network interfaces are connected in a ring with the first network interface 36 coupled to the second network interface 38 which is coupled to the third network interface 40. The third network interface 40 is coupled to the sixth network interface 60 which in turn is coupled to the fifth network interface 58. The fifth network interface 58 is coupled to the fourth network interface 50 which is connected back to the coupled to the first network interface 36. In one embodiment, the network interfaces may be coupled by interconnects.

The fourth network interface 50 is coupled to the second router 44. The third router 46 is coupled to a first isolation circuit 54 and a second isolation circuit 56. The isolation circuit 54 is coupled to the fifth network interface 58. The second isolation circuit 56 is coupled to the sixth network interface 60.

In the arrangement shown in FIG. 1, a power loss agent 48 is provided which is coupled to the second router 44.

In some embodiments, one or more of the initiators is configured to issue one or more requests. A particular request may be destined for a particular target. Responsive to that request, a particular target will provide a response which is routed back to the initiator which issued the corresponding request.

In the arrangement shown in FIG. 1, a power island is provided which is generally referenced 66. The power island 66 comprises the first and second isolation circuits 54 and 56, the fifth and sixth network interfaces 58 and 60 and the second and third targets 62 and 64 respectively. The isolation circuits 54 and 56 isolate this power island from the rest of the integrated circuit.

In the embodiments shown in FIG. 1, two power islands are shown. One is an always on power domain (the area outside the power island 66 in the example of FIG. 1) and one is a domain which can lose power (power island 66 in the example shown in FIG. 1). In alternative embodiments, more than two power islands may be provided.

In the example shown in FIG. 1, the second initiator 32 has issued a request which has been routed to the second network interface 38. The request is routed from the second network interface 38 to the first router 42 and from the first router to the second router 44. The second router 44 has routed the request to the third router 46 which has routed the request to the first isolation circuit 54. From the first isolation circuit 54, the request is routed to the second target 62 via the fifth network interface 58. In other words, the second initiator 32 issues a request for the second target.

Also schematically shown in FIG. 1, the third initiator 34 issues a request for the third target 64. Accordingly, the request is routed to the third network initiator 40. From the third network interface 40, the request is routed to the third router 46 and from the third router 46 to the second isolation circuit 56. The request is then routed to the third target 64 via the sixth network interface 60.

Figure 2:
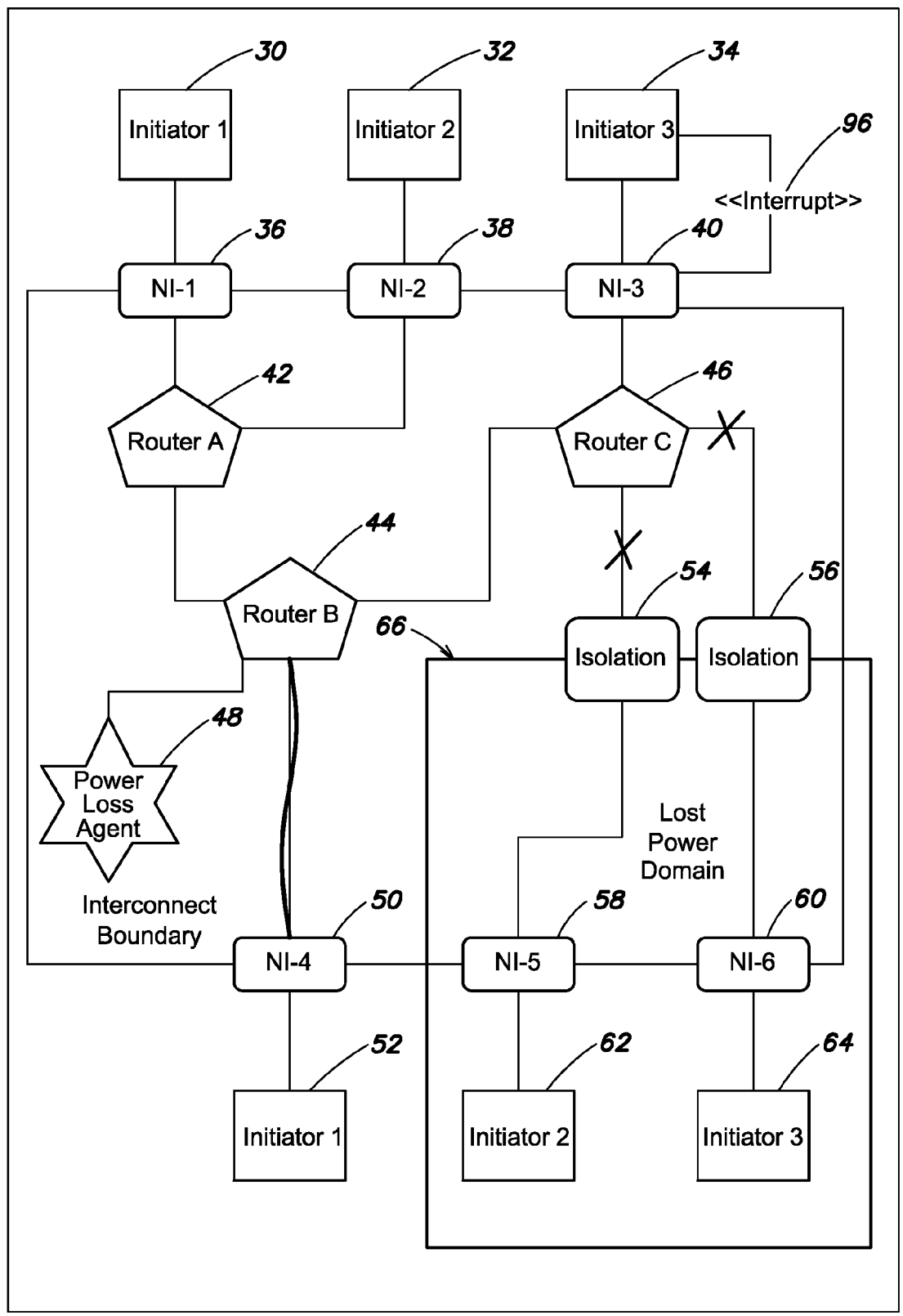
FIG. 2 shows the same integrated circuit as FIG. 1 illustrating broadcast of a packet data unit by a power loss agent.

Reference is made to FIG. 2 which schematically show a scenario where there has been a loss of power to the power island 66. In one embodiment, when there is a power loss, for example if there is a failure in the mains supply, all non-critical parts of the integrated circuit will lose power. In the example shown in FIGS. 1 and 2, the power island 66 is considered to be non-critical and accordingly will instantly lose power.

The power loss agent 48 will be interrupted on power loss. In other words, the power loss agent 48 which is part of the "on domain" of the integrated circuit will be aware when there is power loss from, for example a mains supply.

This may or may not be in real time, depending on an implementation.

In some embodiments, the interrupt which is provided to the power loss agent may simply indicate that there has been a power loss. This may simply mean that all non-critical paths of the system have lost power. In an alternative embodiment, the interrupt may signify a variety of power island configurations which have been lost. For example, the interrupt may indicate which of the power islands have lost power.

The power loss agent 48 is configured to send a broadcast packet data unit on the interconnect provided by the routers. This packet data unit is internal to the interconnect and network interfaces. However, this packet data unit is not sent to the initiators or the targets in some embodiments. In other embodiments, the packet data unit may be sent to initiators and/or targets The packet data unit will not be sent to the lost power island 66.

In some embodiments, the lost power domain 66 may also include system initiators. A target in the powered domain may drop outstanding requests from initiators in the lost power domain.

Figure 3:
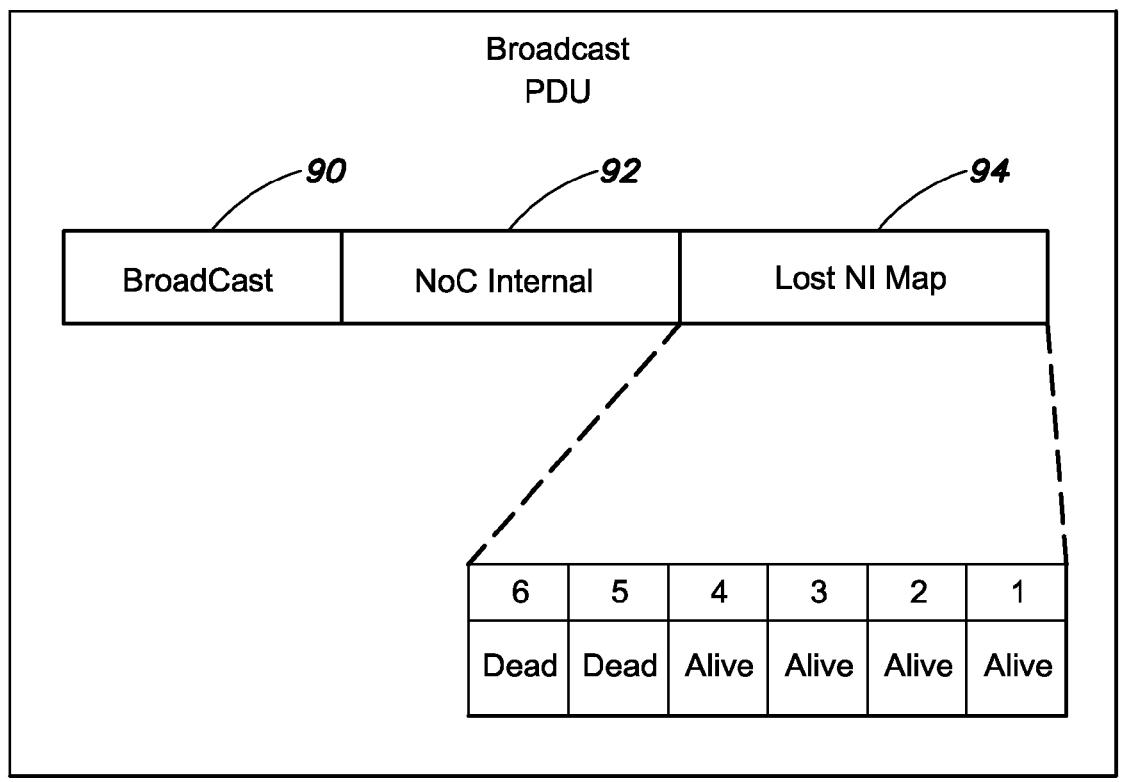
FIG. 3 schematically shows the broadcast packet data unit.

Reference is made to FIG. 3 which shows the broadcast packet data unit. The broadcast packet data unit comprises a first field 90, a second field 92 and a third field 94. The first field 90 is the broadcast field. The broadcast field 90 indicates that the message is a broadcast message. This means that when a router receives the packet data unit, it will pass that packet data unit on to any other router to which it is connected or coupled and/or any one or more network interfaces.

The second field 92 is the network-on-chip internal field This is a tag to indicate that the packet belongs to a protocol which applies to the NoC components and is not a packet which should be passed through the network initiator or target. This may also encode a tag to indicate that the message means 'power lost', and therefore that the following bits contain a lost network interface map.

The third field 94 will indicate which network interfaces are effected by a power loss. In the example shown in FIG. 3, a bit is provided for each of the six network interfaces. The bit has one value if the network interface is on or a second different value if the network interface has lost power.

Accordingly, as shown in the arrangement of FIG. 2, the fifth and sixth interfaces would be indicated as having lost power while the first to fourth network interfaces would be indicated to be "on".

It should be appreciated that the packet data unit shown in FIG. 3 is one example. In an alternative embodiment, the third field may only include information as to which network interfaces are off. Alternatively, the packet data unit may only include information as to which network interfaces are on.

The power loss agent will define this network interface map responsive to the interrupt information received.

As mentioned previously, the PDU is broadcast to the routers and the network interfaces. When a network interface receives the PDU, the network interface will compare outstanding transactions, that is transactions for which a request has been sent but no response has yet been received, against the network interface map. If any of the outstanding transactions match a network initiator that has lost power, the network initiator will synthesise an error response to those transactions of that outstanding transaction.

In some embodiments, the error response could indicate that there has been a power loss. In alternative embodiments, the response sent by the network interface back to the initiator may simply indicate that there has been an error.

In some embodiments, if a valid response returns after the network interface has received the packet data unit, the network interface will suppress that response as it may be an error.

If an initiator issues a new request which is received by a network interface which is to a low power domain, the network initiator may automatically respond to the initiator with an error response.

In some embodiments, once all outstanding transactions to a lost domain have been completed, e.g. with an error response, the network initiator will generate an interrupt to its associated initiator to signal a power loss. One of these interrupts is schematically shown in FIG. 2 between the third network interface 40 and the third initiator 40. This interrupt is referenced 96.

In response to that interrupt, the initiator 34 may power down.

Alternatively or additionally, the initiator can probe the power loss agent 48 which sent the broadcast packet data unit in order to determine which parts of a system-on-chip are affected and restart/stop any software dependent on which parts are affected. Alternatively or additionally, that information may come from the interrupt sent by the corresponding network initiator. That information may be based on, for example the PDU.

If the network initiator is connected to a target which starts to respond to requests from an initiator in a lost domain, i.e. in this example, the initiator is powered down whilst the target is still active, the network interface will not forward the response to the interconnect.

Some embodiments may provide an on-chip interconnect which is power island aware. This means that a system which can recover from an unexpected instant power loss can be built. The interconnect agent will ensure the cleaning up and allow the system to safely continue to operate.

Some embodiments may permit islands of the integrated circuit to safely continue to operate without risk of software or hardware deadlock for components which are still powered.

Figure 4:
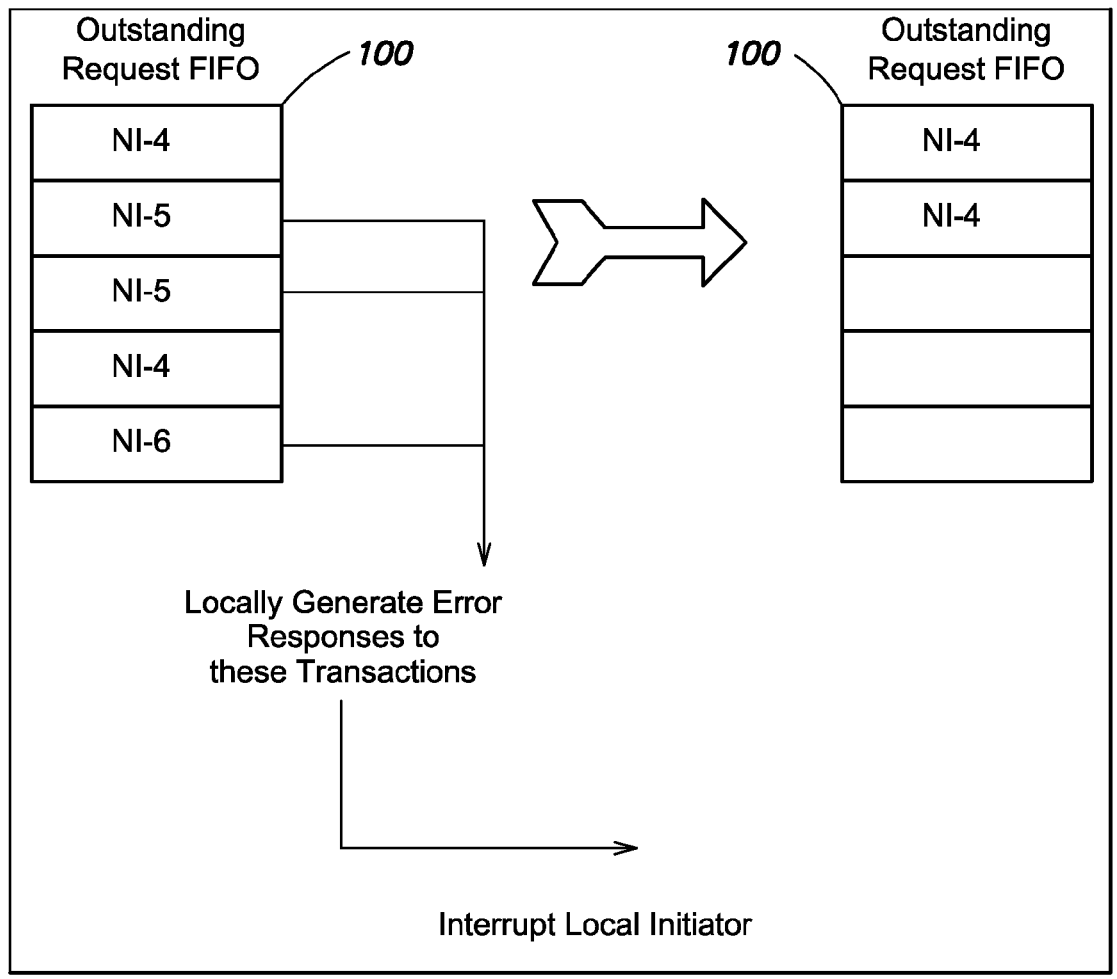
FIG. 4 schematically shows error responses synthesised by a network interface for lost requests.

Reference is now made to FIG. 4 which shows a FIFO 100 in a network initiator. As schematically shown, the FIFO 100 indicates to which network initiators outstanding requests have been issued. By way of example, the FIFO 100 indicates that there are outstanding requests from the fourth, fifth and sixth network initiators. In response to the broadcast PDU, the network initiator is configured to locally generate error responses to the transactions for the fifth and sixth network initiators which are in the lost power domain. Responsive to that PDU, the network initiator causes the FIFO 100 to be cleaned up so that as shown in FIG. 4, the FIFO only includes the outstanding requests for the fourth network initiator. Also as shown figuratively in FIG. 4, the interrupt is generated for sending to the local initiator. Furthermore, error responses are also sent to the initiator for those transactions where the network initiator is switched off.

In one alternative or additional embodiment, the network-on-chip routers may snoop the packet data unit which is broadcast by the power loss agent 48. The routers may update routing tables as appropriate in response to the PDU. For example, the routing table of the third router 44 may be updated to indicate that the path to the fifth and sixth network initiators 58 and 60 is in a lost power domain.

Some embodiments have been described where there is one lost power domain and one on power domain. It should be appreciated that in alternative embodiments, there may be more that one lost power domain and/or one on power domain.

The at least one power on domain and at least one off power domain may be provided on an integrated circuit, discrete circuitry or a combination of the two.

Figure 6:
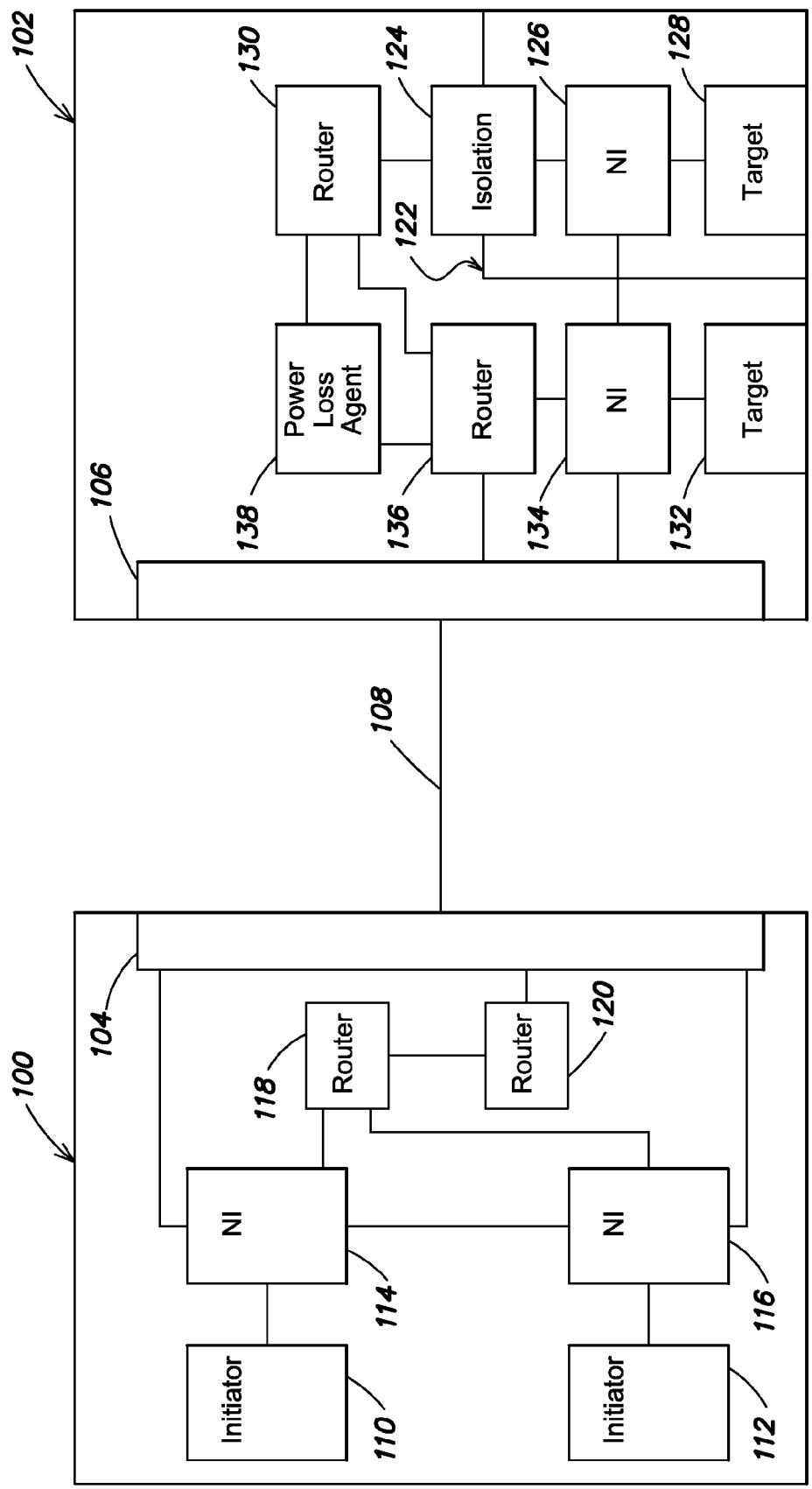
FIG. 6 shows an embodiment in a two die scenario.

Some embodiments may be used in a system in package where there are two or more dies in a single package. One die may be an on domain and another die may be an off domain. Some embodiments may have at least one on power domain and at least one off power domain on at least one die. In this regard, reference is now made to FIG. 6. A first die 100 comprises a first initiator 110 and a second initiator 112. Each initiator is coupled to a respective network interface 114 and 116. The first and second network interfaces 114 and 116 are coupled to a first router 118. The first router is coupled to a second router 120 which is coupled to an interface 104. In this embodiment, the first die may comprise a power domain.

A second die 102 comprise a power loss domain 122. This domain has a target 128 and a network interface 126 coupled thereto. The network interface 126 is coupled to a second network interface 134 which is in a different power domain. In this example, the power domain is an always on power domain. The second network interface is coupled to a second target which again is outside the power loss domain 122 and a first router 136. The first network interface is coupled to isolation circuitry 124. The second die has a second router 130 which is coupled to the isolation circuitry, outside the power domain 122. The first and second routers are coupled to together.

The second die 102 has an interface 106. A link 108 is provided between the interface on the first die and the interface on the second die to allow the first and second die to communicate.

A power loss agent 138 is also provided on the second die and in this embodiment is configured to broadcast messages to the both the routers of the second die.

In this example the network interfaces are coupled in a ring in the following order: first network interface 114 of the first die, a second network interface 116 of the first die, the interface 104, the link 108, the interface of the second die 104, second network interface 134, the first network interface 126, the isolation circuitry 124, second router 130, first router 136, the interface 106 of the second die, the link 108, the interface of the first die 104 and back to the first network interface.

The power loss agent works in the same way as described in relation to the previous embodiments.

One die may contain one or more domains. In one embodiment, one die may be an always on domain whilst the other die may be a power loss domain.

In some embodiments there may be more than two dies.

In this embodiment a ring of network interfaces is provided across the first and second die. In alternative embodiments, a ring may be provided on the first die and a ring may be provided on the second die, with the rings being coupled together.

It should be appreciated that for the above described embodiments have had the network interfaces coupled in a ring. It should be appreciated that this is by way of example only and in alternative embodiments the network interfaces may be otherwise connected or coupled.

Embodiments have been described where a power is lost as a result of a mains power failure. It should be appreciated that embodiments may be used where there is a main battery and a backup battery.

Embodiments may be used where one or more domains are forced into an low power domain to save power.

Figure 7:
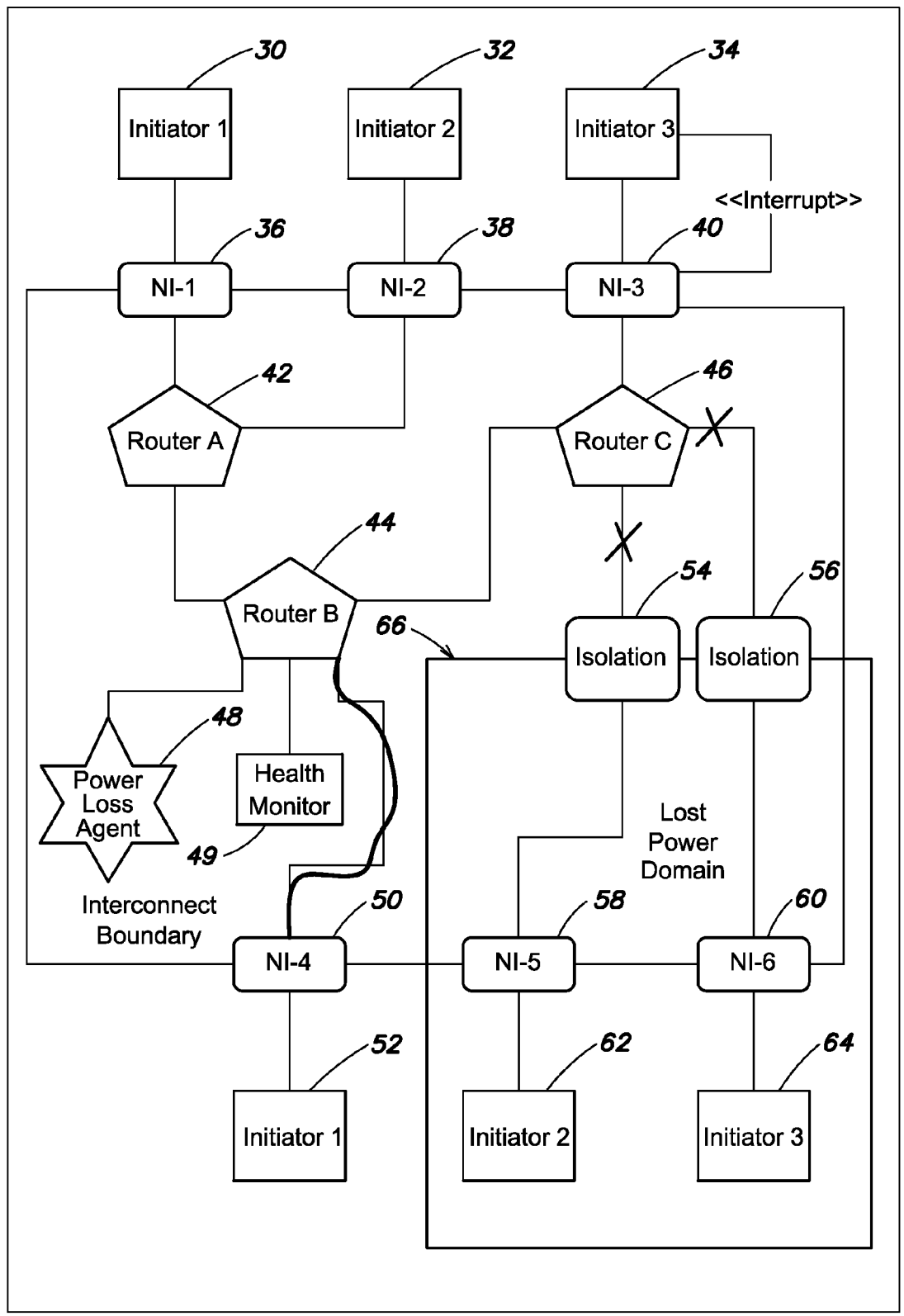
FIG. 7 shows another embodiment.

Reference is made to FIG. 7 which shows a modification to the embodiments of FIG. 1. As can be seen the arrangement comprises additionally a health monitor 49. The health monitor is a configured to determine an error, fault or condition which means that a domain is unable to function or requires resetting. The health monitor may be provided in addition (as shown in FIG. 7) or alternatively to the power loss agent. When an error, fault or condition is determined in a particular domain, in a similar manner to the power loss agent, the health monitor is configured to broadcast a PDU which again will indicate which parts of the arrangement are affected. This PDU may cause a reset to be performed or may provide an alert that a reset has occurred in part of the circuit which may cause request to have been lost etc.

Where the health monitor is provided in addition to the power loss agent, the function of these blocks may be combined to provide a PDU. The same PDU may be used in the case of power loss or an error, fault or condition. Alternative different PDUs may be used. Alternatively a common structure may be used for the PDUs from the power loss agent and the health monitor with an additional indication to indicate if the message is from the health monitor or the power loss agent. This may be indicated by a single bit in some embodiments. In some embodiments, the PDU may contain instructions for one or more parts of the arrangement.

Embodiments may used in any suitable device such as set top boxes, DVD players/recorders, mobile communications devices, mobile telephones, smart phones, tablets, computers, laptops, smart phones, gaming device, music players, MP3 players, televisions or the like. It should be appreciated that this list is by no means exhaustive and is to illustrate the wide range of usages for embodiments.

Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A network on chip (NOC) integrated circuit comprising:
a first circuit portion coupled to a primary power supply and a backup battery power supply and including at least one initiator circuit configured to issue transaction requests, at least one network interface circuit coupled to said at least one initiator circuit, at least one router coupled to said at least one network interface circuit, and a controller coupled to said at least one router; and
a second circuit portion coupled to the primary power supply and not coupled to the backup battery supply and including a target circuit coupled to said at least one network interface circuit and configured to receive transaction requests from said at least one initiator circuit via said at least one router when power is being supplied by the primary power supply;
said controller being configured to receive an interrupt responsive to a power outage from the primary power supply, and to generate and send a notification to said at least one network interface circuit based upon the received interrupt via said at least one router of the power outage when a response is pending from the target circuit for a transaction request issued when power was being supplied by the primary power supply.

2. The integrated circuit of claim 1 wherein said at least one router comprises a plurality of routers; and wherein said controller is configured to broadcast said notification via said plurality of routers.

3. The integrated circuit of claim 1 wherein the notification comprises a packet data unit.

4. The integrated circuit of claim 1 wherein said at least one initiator circuit is configured to suppress a response to a transaction request from said target circuit received after said at least one initiator circuit receives the notification.

5. The integrated circuit of claim 1 wherein said at least one initiator circuit is configured to cease issuing new transaction requests to said at least one target after the notification is received by said at least one network interface circuit.

6. The integrated circuit of claim 1 wherein said at least one initiator circuit is configured to remove pending transactions associated with said at least one target circuit from a queue based upon receiving the notification.

7. A communications terminal comprising:
a primary power supply to be coupled to an electrical power source;
a backup battery supply; and
a network on chip (NOC) integrated circuit comprising
a first circuit portion coupled to said primary power supply and said backup battery power supply and including
at least one initiator circuit configured to issue transaction requests,
at least one network interface circuit coupled to said at least one initiator circuit,
at least one router coupled to said at least one network interface circuit, and
a controller coupled to said at least one router, and
a second circuit portion coupled to the primary power supply and not coupled to the backup battery supply and including a target circuit coupled to said at least one network interface circuit and configured to receive transaction requests from said at least one initiator circuit via said at least one router when power is being supplied by the primary power supply;
said controller being configured to receive an interrupt responsive to a power outage from the primary power supply, and to generate and send a notification to said at least one network interface circuit based upon the received interrupt via said at least one router of the power outage when a response is pending from the target circuit for a transaction request issued when power was being supplied by the primary power supply.

8. The communications terminal of claim 7 wherein said at least one router comprises a plurality of routers; and wherein said controller is configured to broadcast said notification via said plurality of routers.

9. The communications terminal of claim 7 wherein the notification comprises a packet data unit.

10. The communications terminal of claim 7 wherein said at least one initiator circuit is configured to suppress a response to a transaction request from said target circuit received after said at least one initiator circuit receives the notification.

11. The communications terminal of claim 7 wherein said at least one initiator circuit is configured to cease issuing new transaction requests to said at least one target after the notification is received by said at least one network interface circuit.

12. The communications terminal of claim 7 wherein said at least one initiator circuit is configured to remove pending transactions associated with said at least one target circuit from a queue based upon receiving the notification.

13. A method for operating a network on chip (NOC) integrated circuit comprising:
- at a first circuit portion of the NOC integrated circuit coupled to a primary power supply and a backup battery power supply and including at least one initiator circuit, at least one network interface circuit coupled to the at least one initiator circuit, at least one router coupled to said at least one network interface circuit, and a controller coupled to the at least one router, issuing transaction requests from the at least one initiator circuit; and
- at a second circuit portion coupled to the primary power supply and not coupled to the backup battery supply and including a target circuit coupled to the at least one network interface circuit, receiving transaction requests for the target circuit from the at least one initiator circuit via said at least one router when power is being supplied by the primary power supply;
- at the controller, receiving an interrupt responsive to a power outage from the primary power supply, and generating and sending a notification to the at least one network interface circuit based upon the received interrupt via said at least one router of the power outage when a response is pending from the target circuit for a transaction request issued when power was being supplied by the primary power supply.

14. The method of claim 13 wherein the notification comprises a packet data unit.

15. The method of claim 13 further comprising, the at least one initiator circuit, suppressing a response to a transaction request from the target circuit received after the at least one initiator circuit receives the notification.

16. The method of claim 13 further comprising, at least one initiator circuit, ceasing issuing new transaction requests to the at least one target after the notification is received by the at least one network interface circuit.

17. The method of claim 13 further comprising, at the at least one initiator circuit, removing pending transactions associated with the at least one target circuit from a queue based upon receiving the notification.

\* \* \* \* \*